United States Patent
Iversen et al.

(10) Patent No.: US 7,143,902 B2
(45) Date of Patent: Dec. 5, 2006

(54) SYSTEM FOR THE STORAGE AND ORGANIZATION OF CLOTHING UNDER TRAVEL CONDITIONS

(76) Inventors: William W. Iversen, 2009 Linden Lake Rd., Fort Collins, CO (US) 80524; Charlotte M. Iversen, 2009 Linden Lake Rd., Fort Collins, CO (US) 80524

( * ) Notice: Subject to any disclaimer, the term of this patent is extended or adjusted under 35 U.S.C. 154(b) by 202 days.

(21) Appl. No.: 10/854,105

(22) Filed: May 25, 2004

(65) Prior Publication Data

US 2005/0161415 A1    Jul. 28, 2005

Related U.S. Application Data

(60) Provisional application No. 60/537,276, filed on Jan. 15, 2004.

(51) Int. Cl.
*A47H 1/00* (2006.01)
(52) U.S. Cl. .................. 211/123; 211/85.3; 16/87.4 R
(58) Field of Classification Search ............ 211/123, 211/85.3, 105, 206; 248/214; 16/87.4 R
See application file for complete search history.

(56) References Cited

U.S. PATENT DOCUMENTS

| | | | | |
|---|---|---|---|---|
| 1,364,638 A | * | 1/1921 | Pardridge | 211/123 |
| 2,144,772 A | * | 1/1939 | Plants | 224/556 |
| 2,478,377 A | * | 8/1949 | Dickey et al. | 558/104 |
| 2,494,318 A | * | 1/1950 | Sturk | 224/551 |
| 2,520,051 A | * | 8/1950 | Newland | 224/313 |
| 2,522,174 A | * | 9/1950 | Hermsmeyer | 224/551 |
| 2,524,743 A | * | 10/1950 | Wright | 224/313 |
| 2,532,909 A | * | 12/1950 | Hart | 224/551 |
| 2,558,717 A | * | 7/1951 | Davis | 224/313 |
| 2,594,605 A | * | 4/1952 | Zoppelt | 211/123 |
| 2,668,647 A | * | 2/1954 | Osburn et al. | 224/551 |
| 2,777,624 A | * | 1/1957 | Nelson | 224/313 |
| 2,969,881 A | * | 1/1961 | Lilly | 211/105.3 |
| 3,319,853 A | * | 5/1967 | Wigington | 224/313 |
| 3,355,831 A | * | 12/1967 | Shirley | 40/336 |
| 3,481,483 A | | 12/1969 | Harvey et al. | 211/105.3 |
| 3,518,421 A | | 6/1970 | Cogdill | 240/85 |
| 3,918,591 A | | 11/1975 | Cooper | 211/178 |
| 4,488,651 A | | 12/1984 | Bishop | 211/105.6 |
| 4,778,089 A | | 10/1988 | White et al. | 224/42.46 |
| 5,121,844 A | * | 6/1992 | Ball | 211/124 |
| 5,176,304 A | | 1/1993 | Palmer | 224/313 |
| 5,186,341 A | | 2/1993 | Zeid | 211/204 |
| 5,219,080 A | | 6/1993 | Reyes | 211/196 |
| 5,415,299 A | | 5/1995 | Usner | 211/105.1 |
| 5,702,010 A | | 12/1997 | Liang | 211/105.1 |
| 5,833,081 A | | 11/1998 | Smith | 211/86.01 |
| D436,025 S | * | 1/2001 | Ohm et al. | D8/376 |

(Continued)

OTHER PUBLICATIONS

U.S. Appl. No. 60/537,276, filed Jan. 15, 2004, entitled "Automobile Travel Clothes Support Bar"; 7 pgs.

*Primary Examiner*—Richard E. Chilcott, Jr.
*Assistant Examiner*—Lindsay M. Maguire
(74) *Attorney, Agent, or Firm*—Santangelo Law Offices, P.C.

(57) ABSTRACT

A system for organizing one or more articles of clothing such as for hanging in vehicles includes a clothing support with opposing securement elements at each end and a clothing retention element that can provide vertical support and can roughly divide the clothing support mid-way, and a base. The base can aid in providing support and stability such as when positioned over a car seat or a cargo area.

17 Claims, 3 Drawing Sheets

U.S. PATENT DOCUMENTS

| | | | |
|---|---|---|---|
| 6,257,418 B1 | 7/2001 | Allen et al. | 211/1.3 |
| 6,488,159 B1 | 12/2002 | Shuen | 211/123 |
| 2002/0079277 A1 | 6/2002 | Huang | 211/206 |

* cited by examiner

SYSTEM FOR THE STORAGE AND ORGANIZATION OF CLOTHING UNDER TRAVEL CONDITIONS

This application claims the benefit of U.S. Provisional Application No. 60/537,276, filed Jan. 15, 2004, which is incorporated by reference herein.

I. TECHNICAL FIELD

Generally, this invention relates to repositionable organization systems for organizing clothing. Specifically, the invention relates to the use of such systems in the context of automobile travel. The invention particularly is suited for organizing clothing within the rear seat area of the interior of an automobile, the rear cargo space of a sport utility vehicle, or the like.

II. BACKGROUND

It long has been appreciated that the act of travel carries with it a set of problems and challenges that are not usually encountered in typical daily activity. One of the most significant problems engendered by travel is the efficient transport during travel of the personal effects of the traveler. Chief among these personal effects for most travelers is clothing.

As readily can be understood, an individual's choice of clothing is highly subjective. Many individuals invest a significant amount of time and effort into the selection of clothing for daily wear. Often, an individual may accumulate a significant number of articles of clothing so as to maintain a large selection to choose from. Many individuals consider such a selection to be important so as to be able to respond to differing conditions such as changing weather, varying social situations, and the like.

These same considerations, which attend the selection of clothing for daily wear, are equally present when an individual becomes a traveler. The mere act of traveling generally does not diminish the need to maintain a selection of clothing that is responsive to differing conditions such as changing weather, varying social situations, and the like. In fact, these differing conditions frequently are more pronounced during travel than in typical daily activity. For example, travel may involve a higher degree of changing weather than typical daily activity, as when the traveler travels from a warm climate to a cold climate and back again. Another example may be that travel may involve more frequently varying social situations, as may be the case on a business trip. For these and other reasons, a traveler may desire a selection of clothing involving similar numbers of articles of clothing comparable to that available for typical daily activity.

However, the efficient transport of clothing during travel has proved to be a persistent problem. Generally, travel conditions do not afford a traveler the space and organization capabilities that otherwise are available in typical daily activity. Travel conditions often entail a significantly smaller space available for storing clothes than might be available in typical daily activity. Similarly, the options for organizing clothing, for example by size or type, frequently are limited. As a consequence of the limited space and organization capabilities imposed by travel conditions, travelers frequently must make do with a poorly organized, reduced selection of clothing.

Further, the nature of travel may require an organization system for clothing that can be repositioned so as to accompany the traveler during the course of travel. Frequently, the act of repositioning the clothing also may subject the clothing to stresses that may not be present in the types of storage and organization that typically attend non-travel daily activity. These stresses can result in adverse effects such as unattractive wrinkling or folding of the clothing, and such effects can increase in proportion to the number of repositioning events that the clothing is subject to.

This situation readily is illustrated by one age-old solution to the problem of transporting clothing during travel—the suitcase. Most suitcases provide a limited volume of space into which clothing can be stored for travel. Travelers desiring increased storage space for clothing may even resort to the use of additional suitcases. As is easily understood, increasing the number of suitcases also makes travel more cumbersome and less convenient for the traveler. Each time travel is interrupted, for example, by procuring temporary lodging for an evening, the traveler can be required to transport the suitcase to the lodging and unpack it, and subsequently repack and transport the suitcase for travel. Further, most suitcases provide limited organization options for the stored clothing, such as straps, compartments, or dividers. To the extent that organization options such as these may be available, the employment of such options also generally reduces the total volume available within the suitcase for the storage of clothing. Suitcases also subject clothing to confined storage within the interior of the suitcase. This reduces the ease of access to the clothing when use of the clothing is desired, by requiring the traveler to open the suitcase and sift through the stored clothing to find the particular article desired. This also may create adverse folding and wrinkling of the clothing, as storage of clothing within a suitcase usually does not allow the clothing to hang free.

As easily can be appreciated, one of the most frequently employed modes of travel is travel by automobile. Automobiles pose to the traveler all of the challenges just described regarding the efficient transport of clothing during travel. For example, automobiles usually provide a limited amount of space and organization options for clothing during automobile travel. Further, automobile travel generally can involve frequent repositioning of the clothing, for example, when the automobile traveler interrupts travel to procure temporary lodging. Automobiles also pose their own unique challenges to the efficient transport of clothing during automobile travel, such as the specific dimensions and shapes of automobile interiors and the stresses created by the motion of the automobile in travel.

As a result of the circumstances just described, there may exist a long-felt need for a system to organize clothing during travel that effectively minimizes these problems. Numerous attempts may have been made to address this need that, for one reason or another, may have failed to resolve these problems in an appropriate manner. For example, U.S. Pat. Nos. 5,833,081, 5,702,010, 5,415,299, 5,219,080, 5,186,341, 4,488,651, 3,918,591, and 3,518,421 each represent an attempt to create a repositionable organization system for clothing. However, each of these attempts fails to address one of the most widely used modes of transportation—the automobile—and therefore fails to effectively capitalize on the travel-related benefits of having a repositionable clothing organization system that can be used therein.

While attempts also have been made to create a repositionable clothing organization system that can be used within the interior of an automobile, the result of these efforts may have been lacking. This may be the result of a lack of full understanding for the unique challenges posed by the automobile for the efficient transport of clothing during automobile travel.

One challenge posed by the interior of an automobile that may not have been fully appreciated is the limited number of options for securing a clothing organization system. While an automobile interior may have a handle or a hook located above a door, this is not always the case. Where such a handle or hook is present, it easily can be appreciated that the precise placement and orientation of the handle or hook greatly varies according to the numerous makes and models of automobiles that have been produced. Where such a handle or hook is not present, it may be necessary to secure the clothing organization system to some other point within the interior of the automobile, for example, a door handle or window frame. Of course, the placement and orientation of these other interior points may also greatly vary according to the make and model of the automobile. Given these considerations, it is easy to see that an effective clothing organization system may maximize the number of possible securement options, so as to be as responsive as possible to the great variety in the placement and orientation of attachment points within the interior of an automobile. Clothing organization systems created prior to that of the present invention may have failed to appropriately appreciate this fact. For example, U.S. Pat. Nos. 3,481,483 and 6,488,159 present limited options to connect to an attachment point. The clothing organization systems of each of these patents present only one type of connection member. Further, these connection members are adjustable in only one dimension. As easily can be understood, these clothing organization systems can be less effective in situations where a given connection member will not fit an attachment point within the automobile interior, or where the connection member cannot be adjusted to properly orient with the placement of an attachment point within the automobile interior.

Another challenge posed by the interior of an automobile can be the limited volume of space available for the storage of clothing. It easily is seen that automobile interiors represent confined enclosures of varying sizes. This challenge further is complicated by the fact that such volume of space as exists within the interior of an automobile frequently is irregularly shaped or dimensioned. Given these considerations, it easily can be understood that an effective clothing organization system may need to maximize both the storage capacity for clothing and the adjustment options of the clothing organization system to fit the limited amount and irregularly shaped or dimensioned volume of space within the interior of an automobile. This may include allowing both a full or partial load of clothing as well as supporting and maintaining clothing on one side of the device so as to leave packing space that may be needed for other objects, such as golf clubs, boxes, or the like. Clothing organization systems created prior to that of the present invention may have failed to fully appreciate these considerations. For example, U.S. Pat. No. 4,778,089 provides only a limited amount of clothing storage space relative to the space available within an automobile interior. The invention of this patent cannot be adjusted through the full volume of space as may be available to allow for a full or partial load of clothing. As readily can be appreciated, this clothing organization system can be less effective in utilizing the fully available space within the interior of an automobile to organize clothing with greater or even maximum efficiency.

A further challenge posed by automobiles can be the stress placed on clothes and clothing organization systems by the motion of the automobile during travel. It is obvious that the maneuvering of an automobile in travel subjects objects placed within its interior to stresses that vary in both magnitude and direction. These stresses include those due to acceleration and deceleration, change in direction of travel, and vertical displacement due to uneven road surfaces. Such stresses also may be compounded by any unusual weight or weight distributions placed on the clothing organization system. These stresses can have adverse effects on both a clothing organization system and the clothing itself. With respect to a clothing organization system, these stresses can cause the system to become disconnected from the attachment points to which it is attached within the interior of the automobile, or may even cause structural failure of the clothing organization system itself. With respect to clothing, these stresses can cause individual articles of clothing to undergo motions that may displace the position of one article of clothing relative to another both on the organization system itself and within the interior space of the automobile. The result of these situations can include the deleterious wrinkling and folding of clothing and a loss of ability to organize or even maximize storage capacity of clothing under travel conditions. Clothing organization systems created prior to that of the present invention may have failed to fully appreciate these facts. For example, each of U.S. Pat. Nos. 3,481,483, 4,778,089, and 6,488,159 to some degree may fail to include any device to support or stabilize the clothing organization system so as to minimize the impact of the stresses induced by automobile travel. Similarly, each of the inventions of these patents may fail to include a device to counter the motions experienced by clothing during travel. These inventions also may fail to provide horizontal and vertical support for any unusual weight or weight distributions that may be placed on the clothing organization system. As easily can be understood, these inventions even may be less effective in mitigating the stress placed on clothes and clothing organization systems by the motion of an automobile during travel.

As discussed, the foregoing problems regarding the transport of clothing under travel conditions may represent a long-felt need for an effective solution. While implementing elements may have been available, actual attempts to meet this need may have been lacking. This may have been due to a failure of those having ordinary skill in the art to fully appreciate or understand the nature of the problems and challenges involved. Such failure of understanding may have included the importance of providing a number of possible securement options, maximizing the storage capacity and adjustability of the clothing organization system, and mitigating the stress placed on clothes and clothing organization systems during travel. As a result of this lack of understanding, attempts to meet this long-felt need may have failed to effectively solve one or more of the problems or challenges here identified. These attempts may even have led away from the technical directions taken by the present invention and may have resulted in the achievements of the present invention being considered an unexpected result of the approach taken.

III. SUMMARY OF THE INVENTION

Accordingly, the present invention provides a system for the organization of clothing under travel conditions. At least one embodiment of the invention may be adjustable in width and height and may fit many or perhaps even all vehicles. Some embodiments of the invention also may be used in the back seat of a sedan, or in the rear cargo space of a sport utility vehicle. Some embodiments of the invention also may consist of an adjustable clothing support and adjustable clothing retention element. The adjustable clothing support may have a securement element at each end which may rotate and which may hook to the clothes hanger on either side of the back seat area of the vehicle or to another suitable attachment point within the vehicle. An adjustable clothing retention element with a non-skid support base may be fitted over the adjustable clothing support. The invention may be constructed of quality chrome coated or other metal and/or injection molded of durable plastic components or other materials. At least one embodiment of the invention may be horizontally and vertically supported for any unusual weight or weight distributions.

Some embodiments of the invention may provide support during quick starts or unexpected stops that might cause other unsupported clothes rods to fail or otherwise permit clothing to fall. By using an adjustable clothing retention element and/or a non-skid foot support base, some embodiments of the invention may assure a safe and stable support system for articles of clothing placed on the clothing support. The adjustable clothing retention element also may be adjusted from side to side to allow for a full or partial load of clothing, to support and maintain the clothing such as on one side of the clothing support, and to give the traveler the packing space that may be needed for other objects, e.g., golf clubs, boxes, and the like.

Some embodiments of the invention may make it easier and neater to organize clothing compared to packing clothing in a suitcase. Rather than transport and unpack a suitcase, a traveler simply may retrieve clothing as needed and otherwise leave them hanging wrinkle free or put them in only an overnight bag. Often there are not enough hangers in a hotel/motel room closet. Embodiments of the present invention may allow the traveler to have all the hangers needed, and clothing may be easy to select and wear. Some embodiments of the present invention also may avoid or minimize the traveler from having to decide where to put a suitcase that has been unpacked. Using the present invention, the traveler may not need to spend as much or any time packing and unpacking the suitcase. When travel is concluded, the traveler can take clothing not worn and hang them back in a closet.

Accordingly, a broad object of the invention is to simplify and reduce the inconvenience of transporting clothing during travel, particularly in the case of automobile travel. In keeping with this broad object, a goal is to facilitate a system for the movement of clothing under travel conditions. In keeping with this broad object, another goal is the ability to reposition the invention to respond to a variety of automobile configurations.

Another object of the invention is to maximize the number of securement options for securing the invention within an automobile, so as to be as responsive as possible to the great variety in the placement and orientation of attachment points within the interior of an automobile. In keeping with this object, one goal is to provide a variety of securement elements that fit the variety of possible attachment points that may be present within the interior of an automobile. In keeping with this object, another goal is to provide securement elements that can be adjusted to properly orient to the placement of an attachment point within the automobile interior.

Yet another object of the invention is to maximize both the storage capacity for clothing and the adjustment options of the clothing organization system to fit the limited amount and irregularly shaped or dimensioned volume of space within the interior of an automobile. In keeping with this object, a goal is to allow both a full or partial load of clothing. In keeping with this object, another goal is to support and maintain clothing on one side of the device so as to leave packing space that may be needed for other objects to be stored within the interior of the automobile.

A further object of the invention is to minimize the stresses experienced by the clothing organization system and the clothing itself caused by the motion of an automobile in travel. In keeping with this object, one goal is to provide horizontal and vertical support for any unusual weight or weight distributions that may be placed on the clothing organization system. In keeping with this object, a further goal is to provide support during quick starts or unexpected stops and assure a safe and stable support system for articles of clothing placed on the clothing support. In keeping with this object, yet another goal is to allow clothing to hang wrinkle-free during travel and minimize motions that may displace the position of one article of clothing relative to another both within the organization system itself and within the interior space of the automobile.

Still another object of the invention is to minimize the need for a traveler to pack and unpack a suitcase. In keeping with this object, a goal of the invention is to allow a traveler simply to retrieve clothing as needed from the clothing organization system and otherwise allow the clothing to remain hanging.

Naturally, further objects of the invention are disclosed throughout other areas of the specification and claims.

V. DETAILED DESCRIPTION OF THE PREFERRED EMBODIMENTS

As will be seen, the basic concepts of the present invention can be combined and embodied in a variety of ways. The invention includes a variety of aspects related to organization systems for one or more articles of clothing and methods of organizing one or more articles of clothing using the same. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should further be understood to support and encompass a variety of embodiments, systems, techniques, methods, devices, and applications including those with any number of the disclosed elements, with each element alone, and also with any and all various permutations and combinations of all elements in this or any subsequent application. Particular embodiments of the invention are shown in FIGS. 1 to 4.

Figure 1:
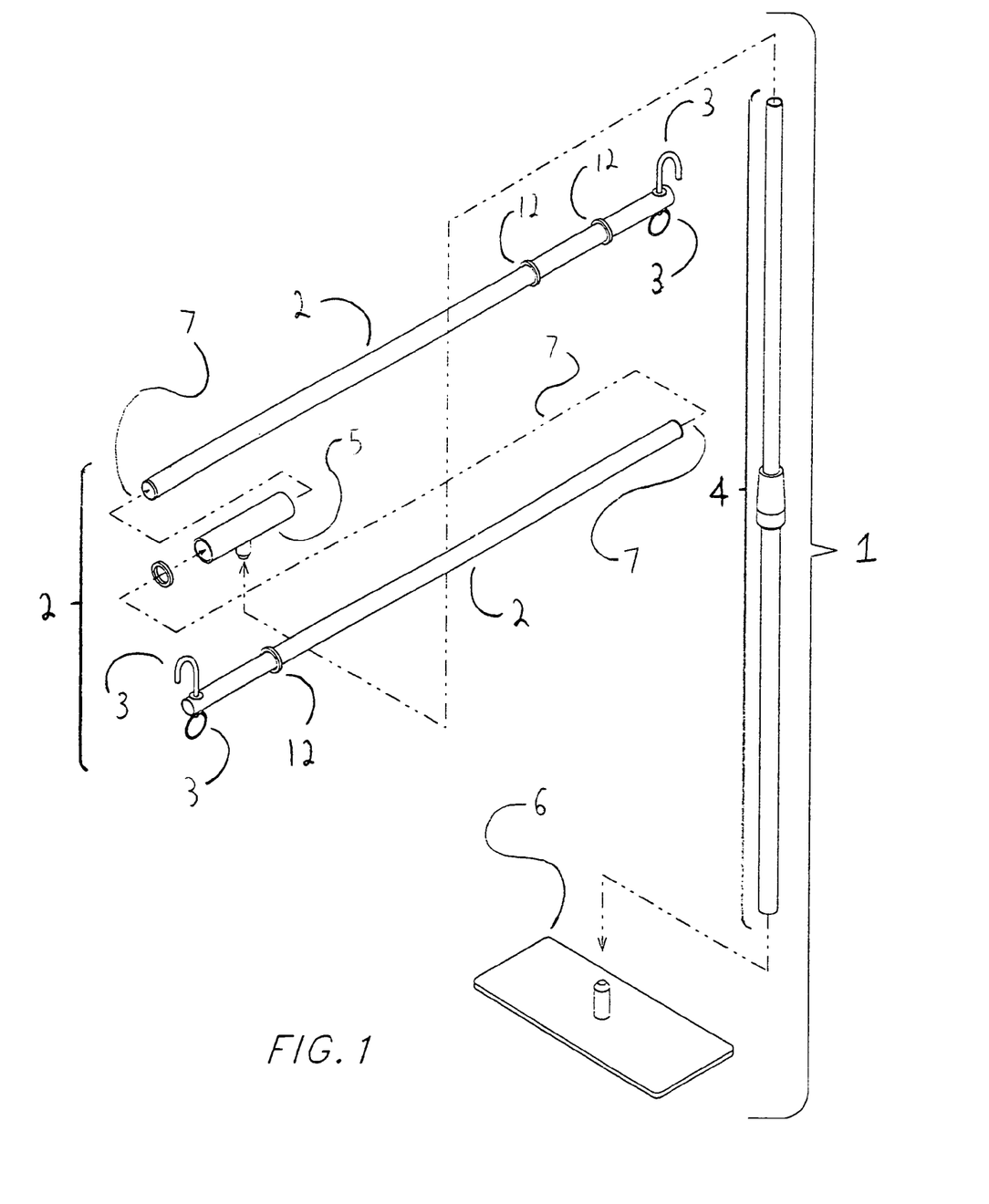
FIG. 1 shows an exploded perspective view of the components of one embodiment of the invention.

Referring now primarily to FIG. 1, an organization system may encompass apparatus or methods as described. In apparatus form, the organization system (1) for one or more articles of clothing is shown in at least one embodiment. The organization system (1) may comprise a clothing support (2) having a lengthwise axis (7). In certain embodiments of the invention, clothing support (2) may comprise a two-piece telescopically adjustable clothing support. However, generally, any element which can be used to hold either an item of clothing or a hanger or the like may be used and may serve as the clothing support (2). At least one securement element (3) may be joined to clothing support (2). Additional embodiments of the invention may further comprise any number of additional securement elements joined to clothing support (2) as may be necessary or desirable. Again, in keeping with the general nature of the invention, the securement element or elements (3) should be understood to encompass any item or element or even portion of an item or element that is used in a manner that either temporarily or perhaps even permanently holds one item (such as the clothing support (3) or otherwise) to another item (such as an automobile hand rail or otherwise). In other embodiments of the invention, one or more clothing divider elements (12) may be joined to clothing support (2). In further keeping with the general nature of the invention, the clothing divider element or elements (12) should be understood to encompass any item or element or even portion of an item or element that is used in a manner that either temporarily or perhaps even permanently divides or otherwise separates at least one article of clothing from at least another article of clothing. Organization system (1) further may comprise a clothing retention element (4). In certain embodiments of the invention, clothing retention element (4) may comprise a two-piece telescopically adjustable clothing retention element, but any item that acts to hold clothing such as by holding it from sliding, by holding a hanger from sliding laterally, or otherwise, should be understood as a more general clothing retention element (4). Clothing retention element (4) may be joined to clothing support (2). In certain embodiments of the invention, this joinder may be accomplished by joining clothing retention element (4) to some sort of connection element, perhaps such as sleeve (5), and further joining sleeve (5) to clothing support (2). Sleeve (5) may be dimensioned to fit clothing support (2) so as to allow sleeve (5) to be translatable along a portion or even substantially all of the lengthwise portion of clothing support (2). Clothing retention element (4) may further be joined to some type of an end, perhaps such as base (6). In certain embodiments of the invention, base (6) may comprise a non-skid base so that it is configured, perhaps by choice of material or even a surface configuration, to resist sliding or other movement when in place. In other embodiments of the invention, base (6) may comprise a surface-comformable base and may even insert into the space between seat upholstery and the like.

Upon considering the embodiment of the invention as shown in FIG. 1, it readily is apparent that organization system (1) may be a self-contained device that is repositionable for use under a variety of travel conditions. As but one example, the embodiment of the invention shown in FIG. 1 may be placed within the interior of a first automobile (not shown) for one trip, and then removed from the interior of the first automobile and placed within the interior of a second automobile (not shown) for another trip. Referring to this manner of utilizing the invention, it easily can be seen that the invention may be repositioned for use under a variety of travel conditions.

Figure 2:
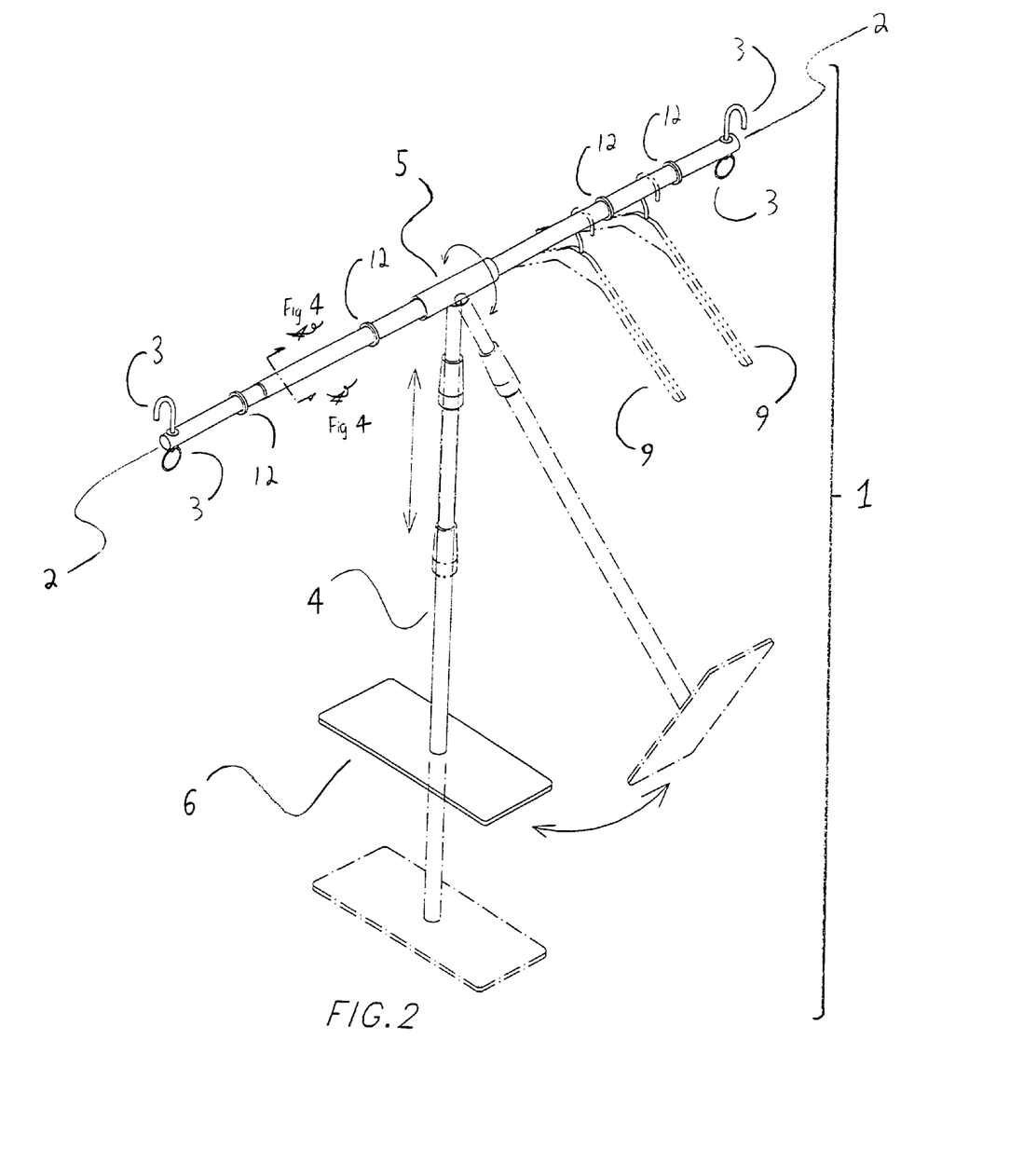
FIG. 2 shows a perspective view of one assembled embodiment of the invention with movement of the clothing support and clothing retention element shown.

Referring now primarily to FIG. 2, the operation of one design of the organization system (1) for one or more articles of clothing is shown in at least one embodiment. A consideration of the various elements of the invention and their interaction as shown in FIG. 2 may further illustrate the functionality of one organization system (1) and its use as part of one method of organizing one or more articles of clothing.

Beginning with securement element (3), FIG. 2 illustrates the joinder of four examples of securement element (3) to clothing support (2) at specific locations along the length of clothing support (2). The joinder of these four examples of securement element (3) to clothing support (2) may be selected so as to maximize the number of possible options for securing clothing support (2) to an attachment point (not shown). As but one example, such an attachment point may include a handle, hook, door handle, window frame, or other suitable attachment point perhaps within the interior of an automobile. Further, notwithstanding the specific embodiment of the invention illustrated in FIG. 2, it easily will be understood that selection of the precise number of examples of securement element (3) and the precise location of their joinder to clothing support (2) can be varied as necessary or desirable within the physical parameters of the invention so as to further maximize the number of possible options for securing clothing support (2) to an attachment point.

Figure 3:
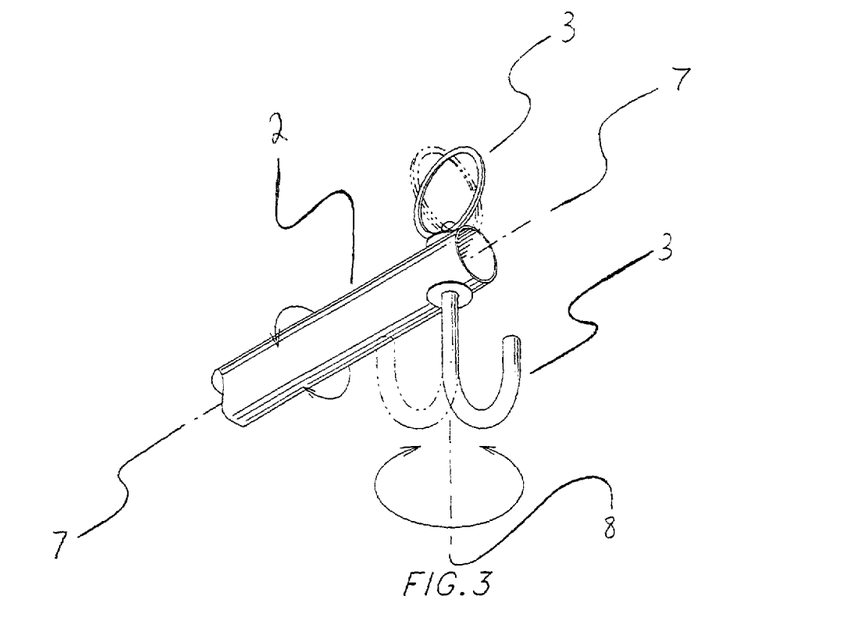
FIG. 3 shows a perspective view of one embodiment of the invention exhibiting two examples of securement elements with movement and position capability of the securement elements shown.

Now referring primarily to FIG. 3, the functionality of securement element (3) in at least one embodiment of the invention as part of organization system (1) and its use as part of a method of organizing one or more articles of clothing further is detailed. Where at least two examples of securement element (3) are present, these examples of securement element (3) may be placed so as to be opposingly positioned. Rotating clothing support (2) about its lengthwise axis as shown may further vary the precise location and orientation of these examples of securement element (3). As a result, it may be possible to secure clothing support (2) to an attachment point (not shown) in a variety of directions. In this manner, it easily is understood that a number of securement directions for clothing support (2) may be established simply by varying the parameters of the elements just described. In just one embodiment of the invention, as shown in FIG. 3, the selection of the number and placement of examples of securement element (3) may comprise two opposingly positioned examples of securement element (3) joined to clothing support (2) opposed at an angle of 180 degrees. Further, notwithstanding the specific embodiment of the invention illustrated in FIG. 3, it easily can be appreciated that the precise number of examples of securement element (3) and the precise angle of their opposition can be varied as necessary or desirable within the physical parameters of the invention so as to additionally maximize the number of possible options that may exist for securing clothing support (2) to an attachment point.

As further shown in FIG. 3, at least one perpendicular axis (8) may be defined so as to intersect with lengthwise axis (7) of clothing support (2). Each of the examples of securement element (3) may be selected so as to rotate about perpendicular axis (8). This rotation may be defined such that each point at which each rotated example of securement element (3) may removably engage an attachment point (not shown) may be situated at a location that is displaced from lengthwise axis (7). In this manner, it may be possible to place each example of securement element (3) at a rotationally displaced location, as wherein all points of the movement described by the rotation of an example of securement element (3) may be displaced from lengthwise axis (7). By perpendicularly rotating a given example of securement element (3) at such a rotationally displaced location, it may be possible to establish more than one direction in which clothing support (2) may be secured to an attachment point. In this manner, clothing support (2) possibly may be secured to an attachment point from any of a number of possible securement directions simply by perpendicularly rotating a given example of securement element (3). Further, the perpendicular rotation in which each example of securement element (3) is rotated may comprise a full and unobstructed 360 degree movement or any subset thereof. In this manner, it easily is understood that a number of rotated securement directions for clothing support (2) may be established simply by varying the parameters of the elements just described. In one embodiment of the invention, as shown in FIG. 3, the selection of the number and placement of examples of securement element (3) may comprise two rotationally displaced, perpendicularly rotatable examples of securement element (3) joined to clothing support (2) that may even rotate in a continuous, unobstructed 360 degree movement. Further, notwithstanding the specific embodiment of the invention illustrated in FIG. 3, it easily can be appreciated that the number of examples of securement element (3), the precise location of their rotational displacement, and the precise movement of their perpendicular rotation can be varied as necessary or desirable so as to additionally maximize the number of possible options that may exist for securing clothing support (2) to an attachment point.

Also as shown in FIG. 3, the specific examples of securement element (3) may comprise any fastener suitable for removably engaging clothing support (2) to an attachment point (not shown). These types of fasteners may include (but are not limited to) hooks, loops, clasps, crimps, tongs, or other suitable kinds of fasteners. Further, any single example of securement element (3) may be joined to clothing support (2) in such a manner so as to be removable and replaceable by a different example of securement element (3). In this manner, it easily is understood that a number of kinds of examples of securement element (3) may be established simply by varying the parameters of the elements just described. In just one embodiment of the invention, as shown in FIG. 3, the selection of the number and placement of examples of securement element (3) may comprise one loop and one hook. Further, notwithstanding the specific embodiment of the invention illustrated in FIG. 3, it easily can be appreciated that the number of kinds of examples of securement element (3) also can be varied as necessary or desirable so as to additionally maximize the number of possible options that may exist for securing clothing support (2) to an attachment point.

Reviewing the discussion of the aspects of the invention as relevant to the embodiment depicted in FIG. 3, it easily can be understood that various embodiments of the invention may provide multiple options for securing clothing support (2) to an attachment point (not shown). These multiple options may include numerous variations in the placement, orientation, and manner of engagement of securement element (3) with the attachment point. As readily is apparent, maximizing the number of options for securing clothing support (2) to an attachment point may increase the number and kinds of attachment points to which clothing support (2) can be secured. In turn, this maximization may increase the number of physical environments and travel conditions under which organization system (1) effectively can be utilized.

Returning now primarily to FIG. 2, clothing support (2) is seen to provide a surface upon which articles of clothing may be stored and organized. In one embodiment of the invention, some type of a hanger (9) may be suspended from clothing support (2), providing hanging storage and organization for one or more articles of clothing. Further, notwithstanding the specific embodiment of the invention illustrated in FIG. 2, it easily can be appreciated that clothing support (2) may provide a support surface for a variety of hanging storage and organization devices not necessarily limited to hanger (9) as shown. In at least another embodiment of the invention, at least one clothing divider element (12) may be joined to clothing support (2). Further, notwithstanding the specific embodiment of the invention illustrated in FIG. 2, it easily can be appreciated that clothing divider element (12) may comprise any of various kinds of elements capable of separating at least one article of clothing from at least another article of clothing not necessarily limited to the specific elements shown.

Upon consideration of clothing support (2) as shown in FIG. 2, it easily can be appreciated that at least this embodiment of the invention may allow one or more articles of clothing to hang freely when stored and organized using the present invention. This may reduce deleterious wrinkling and folding that otherwise may occur when one or more articles of clothing are stored or organized in a manner that does not allow clothing to hang freely. It further easily can be seen that in at least a further embodiment of the invention, clothing divider elements (12) may be used to divide or otherwise separate at least one hanger (9) from at least another hanger (9).

It further easily can be appreciated that hanging storage in the manner as shown in FIG. 2 may allow unimpeded access to the one or more articles of clothing. This unimpeded access may allow any individual article of clothing readily to be added or removed from at least this embodiment of the invention. Such readily available addition and removal of one or more articles of clothing stored and organized on clothing support (2) may promote the ability on any particular occasion to remove only the individual article of clothing as may be necessary or desirable for the circumstances. This, in turn, may reduce the need to transport excess and unwanted articles of clothing when not needed for a particular occasion or stop. This situation may be the case when one or more articles of clothing are stored and organized in a manner not utilizing at least this embodiment of the current invention. One example of this situation may be where a suitcase containing multiple articles of clothing must be transported to and from temporary lodging procured during the course of travel when only one article of clothing is required during the lodging stay.

Returning now primarily to FIGS. 1 and 2, clothing support (2) can be seen to comprise a two-piece clothing support in at least one embodiment of the current invention. Now referring primarily to FIG. 4, the two-piece clothing support may be seen in at least one embodiment of the current invention as a first telescoping component (10) and a second telescoping component (11). First telescoping component (10) may be fitted within second telescoping component (11) so as to allow first telescoping component (10) freely to slide within second telescoping component (11). In this manner, it may be seen that the length of clothing support (2) may be telescopically adjustable. Further, notwithstanding the specific embodiments of the invention illustrated in FIGS. 1, 2, and 4, it easily can be appreciated that clothing support (2) may comprise any number telescoping components not necessarily limited to first telescoping component (10) and second telescoping component (11) as shown. Similarly, notwithstanding the specific embodiments of the invention illustrated in FIGS. 1, 2, and 4, it easily can be seen that clothing support (2) may be continuously telescopically adjustable or telescopically adjustable in any subset thereof.

Figure 4:
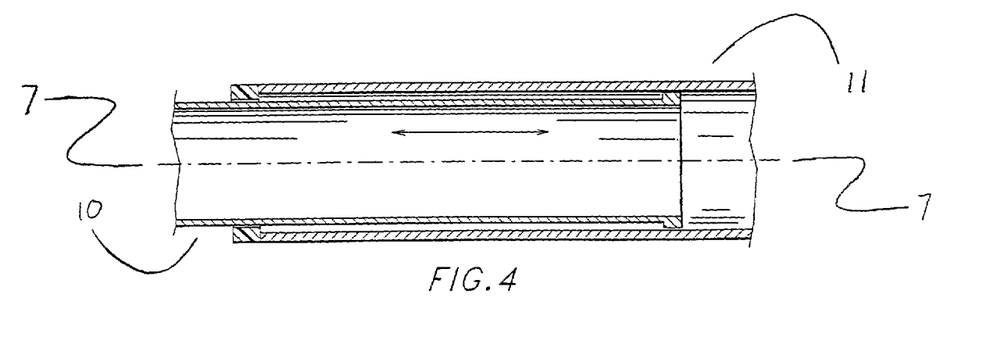
FIG. 4 shows a cross-sectional view of one embodiment of the invention exhibiting a telescopically adjustable clothing support or clothing retention element.

Upon further consideration of clothing support (2) as shown in FIGS. 1, 2, and 4, it easily can be appreciated that telescopically adjusting the length of clothing support (2) may increase the options for utilizing organization system (1) within enclosures of varying sizes and shapes for at least one embodiment of the current invention. Specifically, telescopically adjusting the length of clothing support (2) may allow organization system (1) first to be used within an enclosure of one size and shape, and subsequently to be repositioned for placement in another enclosure of a different size and shape. In this manner, it easily can be seen that the dimensions of the space into which telescopically adjustable clothing support (2) may be fitted is limited only to the maximum length to which clothing support (2) can be expanded for a given embodiment of the invention and the corresponding minimum length to which clothing support (2) can be collapsed for that embodiment of the invention. Further, the telescopic adjustability of clothing support (2) may promote the ability to utilize all of the available storage space of the enclosure into which organization system (1) is positioned.

Additionally, upon further consideration of clothing support (2) as shown in FIGS. 1, 2, and 4, it readily is apparent that telescopically adjusting the length of clothing support (2) may increase the number of options for the placement and orientation of the examples of securement element (3) in at least certain embodiments of the invention. Specifically, causing a telescopic adjustment of the length of clothing support (2) correspondingly causes a displacement in the position of the examples of securement element (3). This displacement occurs along an axis parallel to lengthwise axis (7) of clothing support (2). Further, this displacement in the position of the examples of securement element (3) can add yet another dimension to the overall number of options for the placement and orientation of the examples of securement element (3), which correspondingly adds yet another dimension to the overall number of securement directions in which clothing support (2) may be secured. As a result, when considered in conjunction with the placement and orientation of examples of securement element (3), telescopically adjusting clothing support (2) increases the options for utilizing organization system (1) within enclosures of varying sizes and shapes for at least one embodiment of the current invention.

Returning now primarily to FIGS. 1 and 2, it can be seen that in at least one embodiment of the invention clothing retention element (4) may be joined to clothing support (2). In certain embodiments of the invention, this joinder may be accomplished by joining clothing retention element (4) to sleeve (5), and further joining sleeve (5) to clothing support (2). Sleeve (5) may be responsive to the clothing support (2), and even may be dimensioned to fit clothing support (2) so as to allow sleeve (5) to be momentarily translatable along a portion or substantially all of the lengthwise portion of clothing support (2). Clothing retention element (4) further may be dimensioned in certain embodiments of the invention so as to be substantially proportioned to the typical size of such one or more articles of clothing that may be stored and organized on clothing support (2). Further, notwithstanding the specific embodiments of the invention illustrated in FIGS. 1, 2, and 4, it easily can be appreciated that clothing retention element (4) may be joined to clothing support (2) in any of several manners not necessarily limited to a manner utilizing sleeve (5). Sleeve (5) even may be configured for one side of a telescoping clothing support (2) so all positions of the clothing retention element (4) may be covered by reversing the ends of the clothing support (2).

Upon further consideration of FIGS. 1 and 2, it easily can be seen that in at least one embodiment of the invention, translating clothing retention element (4) may support and maintain one or more articles of clothing stored and organized on clothing support (2). By translating clothing retention element (4) along a portion or perhaps even substantially all of the lengthwise portion of clothing support (2), clothing retention element (4) may be positioned so as to come into physical contact with one or more articles of clothing stored and organized on clothing support (2). A result of this physical contact may be to retain and stabilize the one or more articles of clothing, minimizing the motions that may displace the position of one article of clothing relative to another both relative to organization system (1) itself and within the enclosure in which organization system (1) is placed.

Additionally, upon further consideration of FIGS. 1 and 2, it easily can be seen that in at least one embodiment of the invention, translating clothing retention element (4) may allow for improved organization of one or more articles of clothing stored and organized on clothing support (2). Specifically, by translating clothing retention element (4) along a substantial portion or substantially all of the lengthwise portion of clothing support (2), clothing retention element (4) may be positioned so as to retain the clothing to one side of clothing support (2). This may result in an increased efficiency of use of the space into which organization system (1) is placed, for example, by allowing packing space for additional items on the side of clothing support (2) upon which no clothing is stored or organized. Further, clothing retention element (4) may allow for improved organization of the clothing itself, for example, by allowing one traveler's clothing to be stored and organized on one side of clothing support (2), and another traveler's clothing to be stored and organized on the other side of clothing support (2). Finally, notwithstanding the specific embodiments of the invention illustrated in FIGS. 1 and 2, it easily can be appreciated that more than one clothing retention element (4) may be joined to clothing support (2), and need not necessarily limited to the single example of clothing retention element (4) shown in FIGS. 1 and 2.

Returning now primarily to FIGS. 1 and 2, clothing retention element (4) may comprise a two-piece telescopically adjustable clothing retention element in at least one embodiment of the invention. Now referring primarily to FIG. 4, the two-piece clothing retention element may be seen in at least one embodiment of the current invention to comprise a first telescoping component (10) and a second telescoping component (11). First telescoping component (10) may be fitted within second telescoping component (11) so as to allow first telescoping component (10) freely to slide within second telescoping component (11). In this manner, it may be seen that the length of clothing retention element (4) may be telescopically adjustable. Further, notwithstanding the specific embodiments of the invention illustrated in FIGS. 1, 2, and 4, it easily can be appreciated that clothing retention element (4) may comprise any number of telescoping components not necessarily limited to first telescoping component (10) and second telescoping component (11) as shown. Similarly, notwithstanding the specific embodiments of the invention illustrated in FIGS. 1, 2, and 4, it easily can be seen that clothing retention element (4) may be continuously telescopically adjustable or telescopically adjustable in any subset thereof.

Upon further consideration of clothing retention element (4) as shown in FIGS. 1, 2, and 4, it easily can be appreciated that telescopically adjusting the length of clothing retention element (4) increases the options for utilizing organization system (1) within enclosures of varying sizes and shapes for at least one embodiment of the current invention. Specifically, telescopically adjusting the length of clothing retention element (4) may allow organization system (1) first to be used within an enclosure of one size and shape, and subsequently to be repositioned for placement in another enclosure of a different size and shape. In this manner, it easily can be seen that the dimensions of the space into which telescopically adjustable clothing retention element (4) may be fitted is limited only to the maximum length to which clothing retention element (4) can be expanded for a given embodiment of the invention and the corresponding minimum length to which clothing retention element (4) can be collapsed for that embodiment of the invention.

Additionally, upon further consideration of clothing retention element (4) as shown in FIGS. 1, 2, and 4, it readily is apparent that telescopically adjusting the length of clothing retention element (4) may increase the number of options for the placement and orientation of the examples of securement element (3) in at least certain embodiments of the invention. Specifically, causing a telescopic adjustment of the length of clothing retention element (4) correspondingly causes a displacement in the position of the examples of securement element (3). This displacement occurs along an axis perpendicular to lengthwise axis (7) of clothing support (2). Further, this displacement in the position of the examples of securement element (3) adds yet another dimension to the overall number of options for the placement and orientation of the examples of securement element (3), which correspondingly adds yet another dimension to the overall number of securement directions in which clothing support (2) may be secured. As a result, when considered in conjunction with the placement and orientation of examples of securement element (3), telescopically adjusting clothing retention element (4) increases the options for utilizing organization system (1) within enclosures of varying sizes and shapes for at least one embodiment of the current invention.

Once more considering clothing retention element (4) as shown in FIGS. 1, 2, and 4, it easily can be appreciated that clothing retention element (4) may be telescopically adjusted so as to provide additional support for clothing support (2). Specifically, clothing retention element (4) may be telescopically adjusted and retained in this position so as to come into physical contact with an interior surface of the enclosure into which organization system (1) is placed. This may result in further support and additional stabilization of clothing support (2). In turn, this may mitigate the stresses to which clothing support (2) may be subjected to, promoting increased stability of clothing support (2), any articles of clothing that may be stored and organized on clothing support (2), as well as all of organization system (1) itself. The additional support provided by clothing retention element (4) also may promote the stabilization of organization system (1) in situations where organization system (1) is subjected to unusually large loads or otherwise uneven weight distributions.

Now referring primarily to FIGS. 1 and 2, clothing retention element (4) may be joined to base (6) in at least one embodiment of the invention. Base (6) may comprise a non-skid base or a surface-conformable base. Further, notwithstanding the specific embodiments of the invention illustrated in FIGS. 1 and 2, it easily can be appreciated that clothing retention element (4) may be joined to any suitable base, not necessarily limited to a non-skid or surface-conformable base.

Further considering clothing retention element (4) as shown in FIGS. 1 and 2, the additional support provided by telescopically adjusting clothing retention element (4) may be increased by the joinder of base (6) to clothing retention element (2). Specifically, base (6) may enhance the stabilizing role provided by the physical contact of clothing retention element (4) with an interior surface of the enclosure into which organization system (1) is placed. In at least one embodiment of the invention, this enhancement may be effected by endowing base (6) with non-skid properties. In at least another embodiment of the invention, this enhancement may be effected by endowing base (6) with surface-conformable properties. In either of these cases, support may be increased by minimizing the tendency of clothing retention element (4) to skid or slip due to stresses induced by the travel conditions to which organization system (1) may be subjected to. Further, notwithstanding the embodiments of the invention shown in FIGS. 1 and 2, it easily can be appreciated that base (6) may be endowed with any property suitable for enhancing the stability and support of clothing retention element (4), clothing support (2), and indeed all of organization system (1). These properties need not necessarily be limited to non-skid properties or surface-conformable properties.

Now again referring primarily to FIG. 2, clothing retention element (4) may be joined to clothing support (2) so as to allow clothing retention element (4) to rotate about lengthwise axis (7) of clothing support (2). In certain embodiments of the invention, this may be accomplished by joinder of clothing retention element (4) to sleeve (5), wherein sleeve (5) is dimensioned so as to be fitted over clothing support (2) so as to allow clothing retention element (4) to rotate as described, at least during adjustment. However, notwithstanding the embodiment of the invention shown in FIG. 2, it easily can be appreciated that clothing retention element (4) may be joined to clothing support (2) in any manner suitable to allow clothing retention element (4) to rotate as described. It further readily may be understood that the rotation of clothing retention element (4) as described may comprise a full, unobstructed 360 degree movement or any subset thereof.

Upon further consideration of clothing retention element (4) as shown in FIG. 2, it easily can be seen that rotating clothing retention element (4) about lengthwise axis (7) of clothing support (2) may further enhance the support provided by clothing retention element (4). Specifically, the rotation as described allows clothing retention element (4) to be positioned in physical contact with an interior surface of the enclosure in which organization system (1) is placed at a variety of angles. This flexibility of placement of clothing retention element (4) allows organization system (1) to further accommodate the wide variety of sizes and shapes in which organization system (1) may be placed for use. In certain embodiments of the invention, clothing retention element (4) may be placed substantially vertically with respect to clothing support (2). In being so vertically positioned, clothing retention element (4) may provide substantially vertical support to clothing support (2). In other embodiments of the invention, clothing retention element (4) may be non-vertically positioned, as may be necessary or desirable to accommodate a particular set of travel conditions. Regardless of the actual position in which clothing retention element (4) is placed, the rotation as described may allow clothing retention element (4) to be positioned according to a given set of travel conditions. The rotation as described may even allow clothing retention element (4) to be dynamically positioned to respond to changing travel conditions. Further, the rotation as described may facilitate the repositionable nature of organization system (1), in as much as clothing retention element (4) may be repositioned to accommodate enclosures of differing shapes and sizes.

As can be easily understood from the foregoing, the basic concepts of the present invention may be embodied in a variety of ways. It involves both clothing storage and organization techniques as well as devices to accomplish the appropriate clothing storage and organization. In this application, the clothing storage and organization techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function and vice versa.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure. With this understanding, the reader should be aware that this disclosure is to be understood to support as broad a base of claims as deemed within the applicant's right and numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "support" and even a "means for supporting". Such changes and alternative terms are to be understood to be explicitly included in the description.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the clothing organization and storage devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. An automobile-based organization system for one or more articles of clothing, comprising:
   a. a clothing support having a lengthwise axis;
   b. at least two opposing positioned securement elements joined to said clothing support, wherein each of said at least two opposing positioned securement elements is displaced from said lengthwise axis of said clothing support, and wherein each of said at least two opposing positioned securement elements rotates about an axis perpendicular to said lengthwise axis of said clothing support;
   c. at least one connection element joined to and positioned at a location that divides said clothing support;
   d. at least one translatable, clothing retention element joined to said clothing support, providing substantially vertical support, having first and second ends, positionable at a location that divides said clothing support along its lengthwise axis, and responsive to said clothing support at said first end; and
   e. a base attached to said clothing retention element at said second end of said clothing retention element.

2. An automobile-based organization system for one or more articles of clothing as described in claim 1, wherein each of said at least two opposing positioned securement elements rotates in a movement selected from the group consisting of a 360 degree movement, a 270 degree movement, a 180 degree movement, and a 90 degree movement.

3. An automobile-based organization system for one or more articles of clothing as described in claim 1, wherein each of said at least two opposing positioned securement elements are opposed at an angle selected from the group consisting of 180 degrees, 120 degrees, 90 degrees, and 45 degrees.

4. An automobile-based organization system for one or more articles of clothing as described in claim 3, wherein each of said at least two opposing positioned securement elements rotates in a movement selected from the group consisting of a 360 degree movement, a 270 degree movement, a 180 degree movement, and a 90 degree movement.

5. An automobile-based organization system for one or more articles of clothing as described in claim 1, wherein said translatable clothing retention element translates along substantially all of said clothing support.

6. An automobile-based organization system for one or more articles of clothing as described in claim 4, wherein said translatable clothing retention element translates along substantially all of said clothing support.

7. An organization system for one or more articles of clothing as described in claim 1, wherein said clothing support having a lengthwise axis is telescopically adjustable.

8. An organization system for one or more articles of clothing as described in claim 1, wherein said clothing support having a lengthwise axis is rotatable about said lengthwise axis.

9. An organization system for one or more articles of clothing as described in claim 1, wherein each said securement element is selected from the group consisting of hooks, loops, or fasteners.

10. An organization system for one or more articles of clothing as described in claim 1, wherein each said securement element is replaceable.

11. An organization system for one or more articles of clothing as described in claim 1, wherein said translatable clothing retention element is telescopically adjustable.

12. An organization system for one or more articles of clothing as described in claim 1, wherein said translatable clothing retention element provides support for said clothing support.

13. An organization system for one or more articles of clothing as described in claim 1, wherein said translatable clothing retention element provides substantially vertical support for said clothing support.

14. An organization system for one or more articles of clothing as described in claim 1, wherein said translatable clothing retention element is rotatable about said lengthwise axis of said clothing support.

15. An organization system for one or more articles of clothing as described in claim 14, wherein said translatable clothing retention element is vertically positioned relative to said lengthwise axis of said clothing support.

16. An organization system for one or more articles of clothing as described in claim 1, wherein said translatable clothing retention element further comprises a non-skid base.

17. An organization system for one or more articles of clothing as described in claim 1, wherein said translatable clothing retention element further comprises a surface-conformable base.

* * * * *